Dec. 30, 1969  D. FIRTH  3,486,348
FLEXIBLE COUPLING
Filed Feb. 5, 1968  2 Sheets-Sheet 1
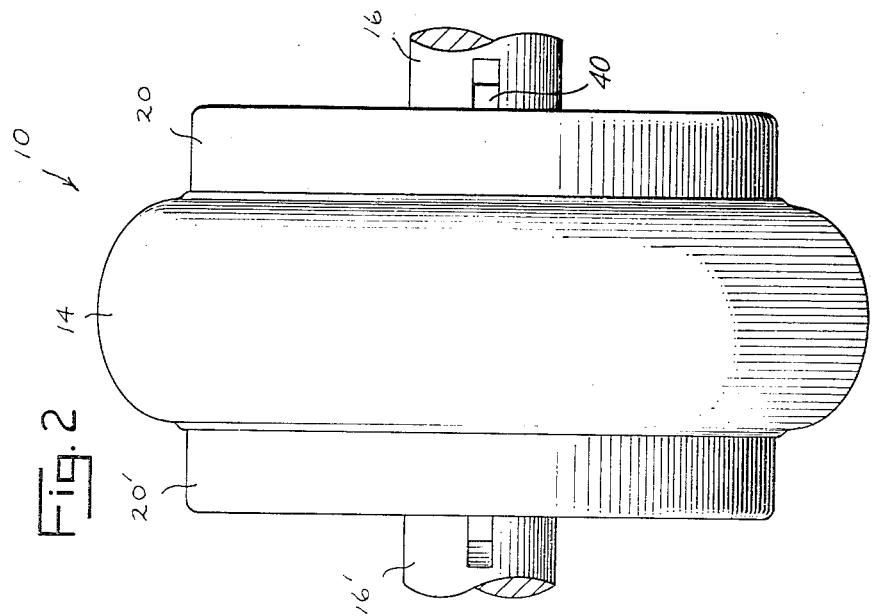
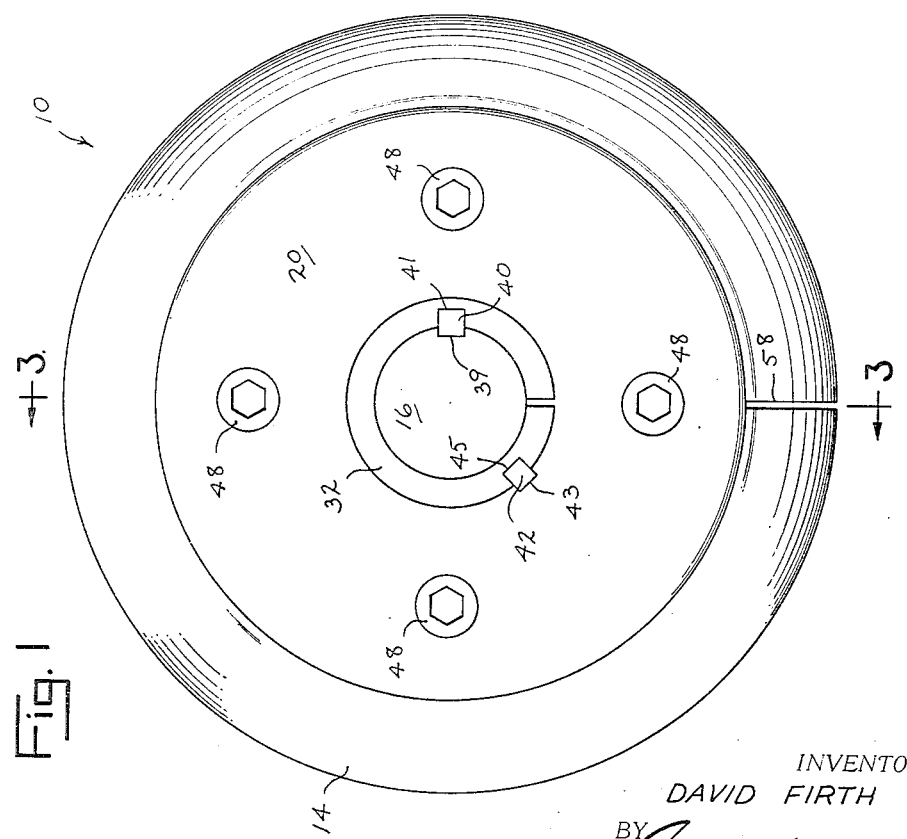
INVENTOR.
DAVID FIRTH
BY Eugene C. Knoblock
ATTORNEY INVENTOR.
DAVID FIRTH
BY Eugene C. Knoblock
ATTORNEY United States Patent Office 3,486,348
Patented Dec. 30, 1969

3,486,348
FLEXIBLE COUPLING
David Firth, 1441 E. Jefferson Blvd.,
South Bend, Ind. 46617
Filed Feb. 5, 1968, Ser. No. 703,132
Int. Cl. F16d *3/52, 1/06;* F16c *3/10*
U.S. Cl. 64—11                                11 Claims

ABSTRACT OF THE DISCLOSURE

A flexible coupling for connecting two substantially axially aligned rotatable shafts in which a hub with a tapered bore fits around the end of each shaft and clamp means are mounted to each hub. An annular flexible member interconnects the respective husband is secured thereto by the clamp means. A split tapered bushing is disposed within the bore of each hub and encircles each shaft and is actuated by said clamp means to lock said hub to said shaft. Actuation of each clamp means simultaneously clamps said flexible member to a hub and advances said bushing to locked engagement with said shaft and hub.

SUMMARY OF THE INVENTION

The invention relates to a flexible coupling for connecting two substantially axially aligned rotatable shafts and includes hubs each having a tapered bore and encircling the end of a shaft, clamp means mounted on each hub, split tapered bushing positioned within each hub and encircling a shaft and operatively engaged by said clamp means so that upon actuation of the clamp means, the bushing is shifted relative to the hub causing the shaft to be locked to the hub, and an annular flexible member arcuate in cross section and having two integral rim parts. The flexible member interconnects the hubs, having each rim part mounted between a clamp means and a hub and clamped by actuation of said clamp means.

Flexible couplings heretofore used involve the use of a bushing which can be wedged between the coupling hub and the shaft, which bushing and hub have been drilled and tapped to accommodate a plurality of screw members. These screw members are inserted between the bushing and hub and some are utilized to advance the bushing on the shaft to wedge and lock the shaft in the hub while others are used to forcibly separate the wedged hub and bushing. A separate locking means is utilized to connect the flexible member of the coupling to the hubs.

This invention pertains to an inexpensive and easily assembled coupling in which actuation of means for clamping the flexible member also causes the simultaneous locking of the shaft to the hub by a tapered bushing. The tapered bushing is designed so that it normally frees itself from frictional engagement with the hub upon a slight loosening of the clamp means, thus allowing the shaft to be withdrawn from the coupling without having to remove the interconnecting flexible member from the coupling.

Accordingly, it is a purpose of this invention to provide a flexible coupling which is of inexpensive manufacture, requires a minimum number of parts and eliminates the use of locking wedge angles therein.

It is a further object of this invention to provide a flexible coupling which can be rapidly and easily assembled to interconnect two substantially axially aligned rotative shafts.

It is another object of this invention to provide a flexible coupling from which a selected shaft may be rapidly disconnected and thereafter reconnected without having to disassemble the coupling.

Other objects of this invention will become apparent upon a reading of the invention's description.

BRIEF DESCRIPTION OF THE DRAWINGS

The preferred embodiment of this invention has been chosen for the purposes of illustration and description wherein:

FIG. 1 is an end elevation of the flexible coupling of this invention.

FIG. 2 is a side view of the flexible coupling of this invention.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 3:
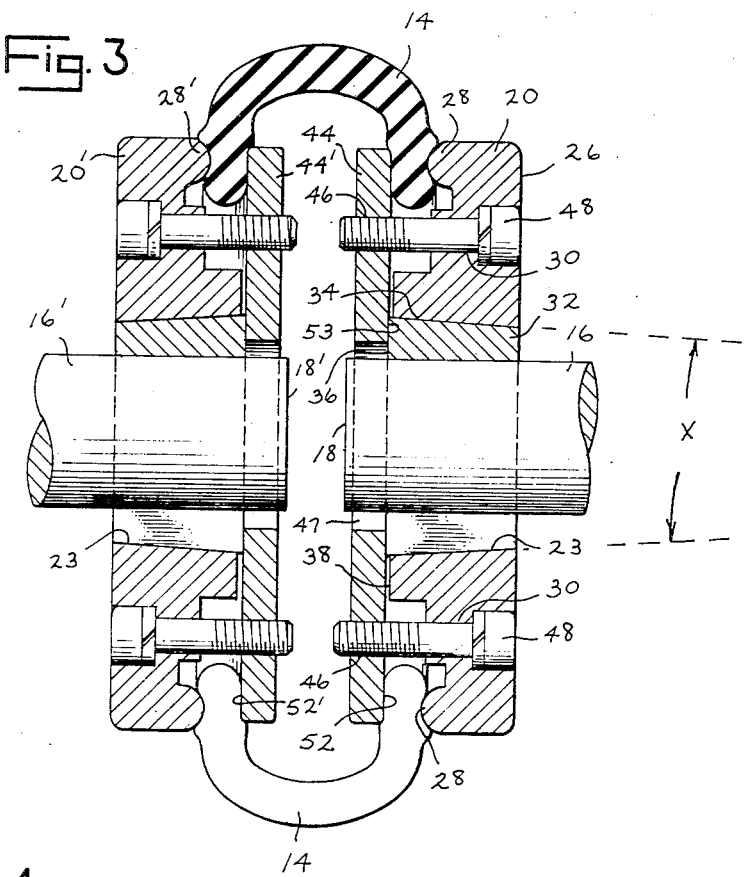
FIG. 3 is an axial sectional view of the flexible coupling taken along line 3—3 of FIG. 1.

With reference to the drawings, in particular to FIGS. 1–3, the flexible coupling 10 includes two hubs 20 and 20′ interconnected by a flexible tire-like member 14 and each encircling one of two rotatable shafts 16 and 16′. Shafts 16 and 16′ are in substantial axial alignment and have their ends 18 and 18′ spaced apart. Shaft 16 may be connected to a drive means (not shown) and shaft 16′ may be connected to a driven means (not shown). Although not shown, shafts 16 and 16′ may be of different diameters.

Each hub 20 is a rigid annular part having an axial aperture or bore defined by a tapered circular wall 23 having its large diameter end innermost in use. The outer circumferential margin 26 of hub 20 is preferably of reduced cross section or thickness, having an integral axially inwardly projecting annular concentric thickened rib 28. Rib 28 is preferably arcuate in cross section. Hub 20 has a plurality of apertures or bores 30 preferably disposed equiangularly and spaced equally from aperture 22 and from rib 28.

Disposed within the axial aperture of each hub 20 is a tapered split bushing 32 having an outer conical surface 34 which is preferably complementary to tapered wall 23 of the axial aperture of a hub. The included angle of taper of the conical surface 34 of bushing 32 and of the tapered circular wall 23 of hub 20, designated as X in FIG. 3, may vary between about 2° to 60° and is preferably greater than 14°, i.e. it is of such an angle that upon release of a clamp means, later to be described, which holds the bushing in frictional, axial engagement with the hub and with a shaft, the bushing will free itself from the hub without assistance or with minimum resistance. The split bushing 32 may be formed in one integral piece as shown in the drawings or may consist of a plurality of arcuate sections.

Mounted within bushing 32 is the end portion of shaft 16. The length and maximum diameter of bushing 32 are such that the inner large diameter end portion thereof will project beyond the interior face 38 of the thick central part of hub 20 when shaft 16 is locked within said bushing. Shaft 16 and bushing 32 may have complementary longitudinal slots 39 and 41 formed therein in which is disposed a key 40. Also, a key 42 may be disposed in complementary longitudinal slots 43 and 45 formed in hub wall 23 and bushing 32. For applications involving the transmission of low torque between shafts, it will not be necessary to key the shaft, bushing and hub.

A pair of annular clamp plates or rings 44 each having a central aperture 47 of a greater diameter than the outer diameter of any shaft intended to be mounted within coupling 10 are carried by hubs 20. The inner circumferential margin 53 of each clamp plate confronts the inner end face 36 of a bushing 32. Each clamp plate 44 has a plurality of threaded bores 46 in registry with bores 30 in a hub 20. A screw 48, such as a cap screw passes through each hub bore 30 and threads into each registering plate bore 46, having its head preferably abutting a recessed annular shoulder 50 in the hub. The outer dimension of each clamp plate 44 is preferably of substantially the same dimension as the outer diameter of hub 20 so that the outer peripheral margin 52 of the clamp plate is directly opposed to the annular rib 28 of the hub 20.

Figure 4:
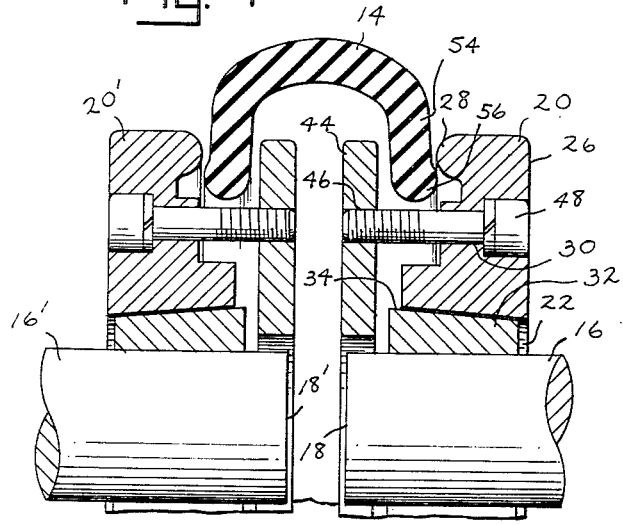
FIG. 4 is a fragmented axial sectional view of the flexible coupling of this invention showing clamping rings in releasing position, with the margins of the flexible interconnecting member loosely inserted between cooperating clamping rings and hubs.

The flexible tire-like member 14 is substantially annular in shape and of arcuate cross section. It is preferably formed from an elastic material such as rubber and may have reinforcing webs of nylon or other suitable material molded therein. Flexible member 14 has two rim parts 54 each of which preferably has an exterior thickened bead 56, as shown in FIG. 4. Member 14 is preferably split at 58 substantially radially thereof to facilitate mounting thereof between the hubs 20 and 20'. One rim part 54 is annularly secured between margin 52 of one clamp plate 44 and the rib 28 of adjacent hub 20, and the other rim part 54 is similarly secured between margin 52' of clamp plate 44' and rib 28' of hub 20', as shown in FIG. 3.

To mount shaft 16 to the coupling 10, bushing 32 is slidably positioned and keyed within the axial aperture of a hub 20. Clamp plate 44 may then be positioned adjacent said hub 20 by having screws 48 threaded partially into bores 46 of said clamp plate. Flexible member 14 is then applied around clamp plate 44 with its rim part 54 annularly positioned between plate margin 52 and hub rib 28, with bead 56 positioned interiorly of rib part 28 of the hub as shown in FIG. 4. Shaft 16 may now be inserted within bushing 32 and keyed thereto.

With clamp plate 44 and hub 20 and shaft 16 assembled as described above, screws 48 are successively advanced or turned, causing the inner margin of clamp plate 44 to be drawn against bushing end face 36 and its outer margin 52 to engage the rim part 54 of tire member 14. Continued rotation of screws 48 causes the advance of clamp plate 44 toward hub 20 to urge the bushing member 32 into the axial aperture of the hub, causing frictional engagement of the tapered surfaces 23 and 34 so that the bushing is constricted and shaft 16 is tightly gripped by the bushing member to prevent its withdrawal or rotative movement with respect to the hub 20. The advance of outer margin 52 of clamp plate 44 causes flexible member 14 to be tightly squeezed against hub rib 28, thus preventing any relative movement of the flexible member with respect to the hub. The number of screws 48 for each hub will obviously be dependent upon the size of the coupling. In like manner shaft 16' may be mounted to the coupling 10.

To release shaft 16 from the coupling 10, the screws 48 in the adjacent hub need only be partially loosened causing the backing off of clamp plate 44 from bushing end face 36. This frees the bushing 32 from frictional contact with the axial aperture of hub 20. Once bushing 32 is freed from frictional engagement with the aperture of hub 20, it may expand so that shaft 16 may be withdrawn. The clamp plate 44 may remain in proximity to hub 20 so that rim part 54 of flexible member 14 continues to be engaged or loosely positioned between the clamp plate and the hub. When it is desired to recouple shaft 16, the shaft is reinserted into the bushing 32 and the screws 48 of the adjacent hub are turned to urge the clamp plate 44 against the bushing member, forcing it into the hub 20.

Figure 5:
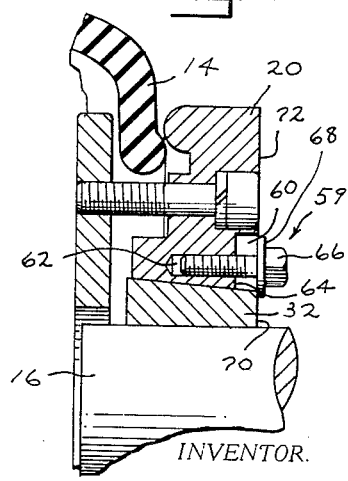
FIG. 5 is a fragmented axial sectional view of a modified form of the flexible coupling of this invention having means for freeing the tapered bushing from the hub.

When the included angle of the bushing is between approximately 2° and 12° the bushing will wedge and lock in the hub and will not be automatically freed from this locked wedge relation upon loosening of screws 48. In this case each hub may be modified to include a releasing assembly 59 as shown in FIG. 5. Hub 20 has a recess 60 adjacent its axial aperture which is defined in part by an end wall 64. A threaded bore 62 communicates with the recess and receives a machine screw 66. A washer 68 encircles the screw 66 and engages the end face 70 of bushing 32. Recess 60 is larger than washer 68 so that the washer does not engage the outer face 72 of hub 20. After loosening screws 48, screw 66 may be turned into hub 20 causing the hub to be drawn toward the small end of the bushing 32, thus freeing the bushing.

It is apparent from the above description, that flexible coupling 10 may be readily and rapidly assembled by the simple actuation of the screw members 48. By the selection of hub and bushing having a non-locking included angle, the bushing will automatically free itself when the screws 48 are released or at most will require only a slight tap upon the hub to break the frictional contact between the hub and the bushing, thus releasing the shaft. The utilization of an axially shiftable bushing reduces the stresses created in the hub during engagement of the bushing with the hub as compared to the stresses therein created by using screws inserted between the hub and the bushing as in the prior art couplings.

It will be understood that the invention is not to be limited to the details herein given but may be modified in accordance with the appended claims.

What I claim is:

1. A flexible coupling for connecting two substantially axially aligned rotatable shafts comprising
a hub encircling each of said shafts with clearance;
a clamp member cooperating with each hub;
a split tapered bushing disposed within each hub and loosely encircling a shaft, said clamp member including a part abutting said bushing to axially shift said bushing relative to said hub upon actuation of said clamp advancing means to lock said shaft to said hub;
an annular flexible member of curved cross section and having two integral rim parts;
one rim part being positioned between each hub and the clamp member cooperating therewith;
actuation of said clamp advancing means simultaneously gripping the rim part of said flexible member between said clamp member and said hub and causing said bushing to frictionally grip said shaft and said hub.

2. The flexible coupling of claim 1, in which each hub has a central tapered bore having its large diameter portion positioned innermost.

3. The flexible coupling of claim 2, wherein said bushing is tapered similarly to said hub bore.

4. The flexible coupling of claim 3, wherein the included angle of taper of said bushing and hub is at least 14°.

5. The flexible coupling of claim 2, wherein said bushing has its large diameter end portion projecting beyond said hub, said clamp member includes a ring positioned spaced inwardly of the adjacent hub, said ring abuts the projecting end portion of said bushing, and said flexible member has each of its rim parts positioned and gripped between a ring and a hub.

6. The flexible coupling of claim 5, wherein the outer portion of each hub has an annular inwardly projecting thickened rib, each rim of said flexible member has an annular thickened bead, and said flexible member encircles said ring and is clamped spaced from said bead by said hub rib and said ring.

7. A flexible coupling of claim 5, wherein each hub has a plurality of circumferentially spaced bores and said ring has a plurality of threaded bores in registry with said hub bores, and said clamp advancing means includes a headed screw positioned in each hub bore with its head abutting said hub and its threaded part received in a ring threaded bore, whereby rotation of said screws draws the ring toward said hub and axially shifts said bushing member into frictional engagement with said hub and said shaft.

8. The flexible coupling of claim 5, wherein each hub has a threaded bore and a communicating recess adjacent the hub bore, said bushing having its small diameter end part projecting relative to the recessed part of said hub, a headed screw threaded in said hub threaded bore, and a washer smaller than said recess encircling said screw under its head and engaging the end face of the small end part of said bushing.

9. A flexible coupling for interconnecting a pair of axially aligned shafts comprising
  a pair of spaced annular hubs each having a tapered bore larger than a shaft, a plurality of substantially equispaced apertures and a reduced thickness outer marginal portion terminating in a thickened annular rib;
  a pair of split bushings each loosely encircling a shaft and having a tapered exterior surface complementary to the taper of and fitting in the bore of a hub;
  the large diameter portions of said bushings projecting from the innermost surfaces of said hubs;
  a pair of clamp rings positioned between and spaced from said hubs and each having a plurality of threaded bores registering with said hub apertures, each ring abutting the end of an adjacent bushing;
  a flexible member of U-shape in cross section encircling said clamp rings with clearance and having annular rim parts each interposed between a clamp ring and the rib of a hub; and
  a plurality of headed screws each extending through a hub aperture and threaded in a clamp ring bore to connect the adjacent hub and ring with the screw head abutting the hub whereby rotation of the screws of a hub advances the connected ring toward said hub to axially shift the bushing abutted thereby within the tapered bore of the hub to reduce said bushing to grip the shaft which it encircles and to simultaneously clamp between said ring and hub the interposed rim part of said flexible member.

10. A flexible coupling as defined in claim 9, wherein the included angle of taper of said hub bore and bushing exterior surface is greater than 14°.

11. A flexible coupling as defined in claim 9, wherein each rim part of said flexible member includes a thickened bead positioned radially inwardly relative to the rib of the hub portion clamping said rim part.

References Cited

UNITED STATES PATENTS

| 2,710,762 | 6/1955 | Whitaker | 287—52.06 |
| 3,020,737 | 2/1962 | Firth | 64—11 |
| 3,024,628 | 3/1962 | Yank | 64—11 |
| 3,283,535 | 11/1966 | Grundtner | 64—11 |
| 3,385,080 | 5/1968 | Sorenson | 64—11 |

HALL C. COE, Primary Examiner

U.S. Cl. X.R.

287—52.06